(No Model.) 6 Sheets—Sheet 2.

C. H. REID.
HAT MANUFACTURING MACHINE.

No. 292,356. Patented Jan. 22, 1884.

Witnesses
S. S. W^m son
A. N. Wooster

Inventor
Charles H. Reid
By Wooster & Smith
Attys.

(No Model.)  6 Sheets—Sheet 3.
C. H. REID.
HAT MANUFACTURING MACHINE.
No. 292,356. Patented Jan. 22, 1884.
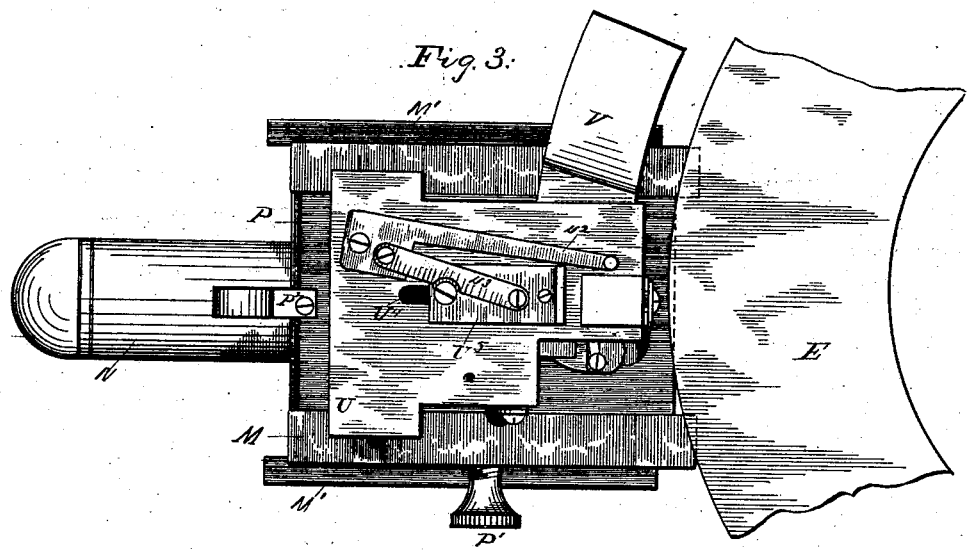
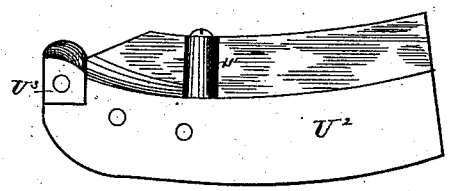
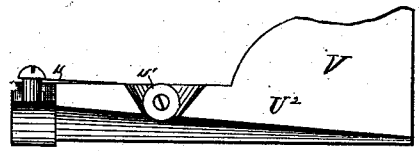
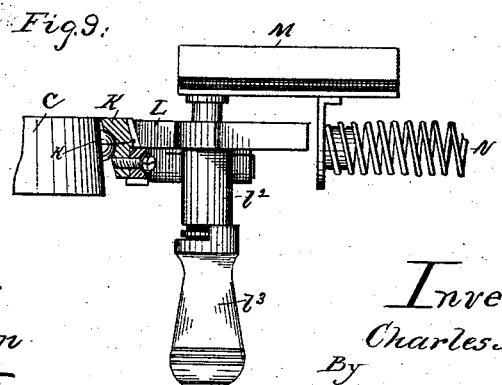
Witnesses
S. S. Wmson
A. M. Wooster
Inventor
Charles H. Reid
By Wooster & Smith
Attys.

(No Model.)  6 Sheets—Sheet 4.
C. H. REID.
HAT MANUFACTURING MACHINE.
No. 292,356.  Patented Jan. 22, 1884.
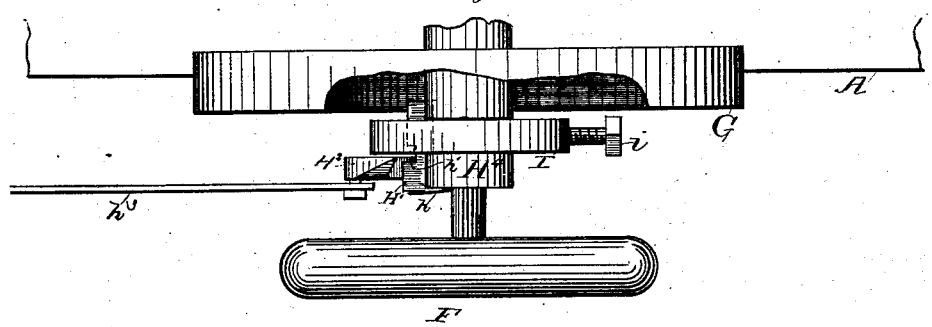
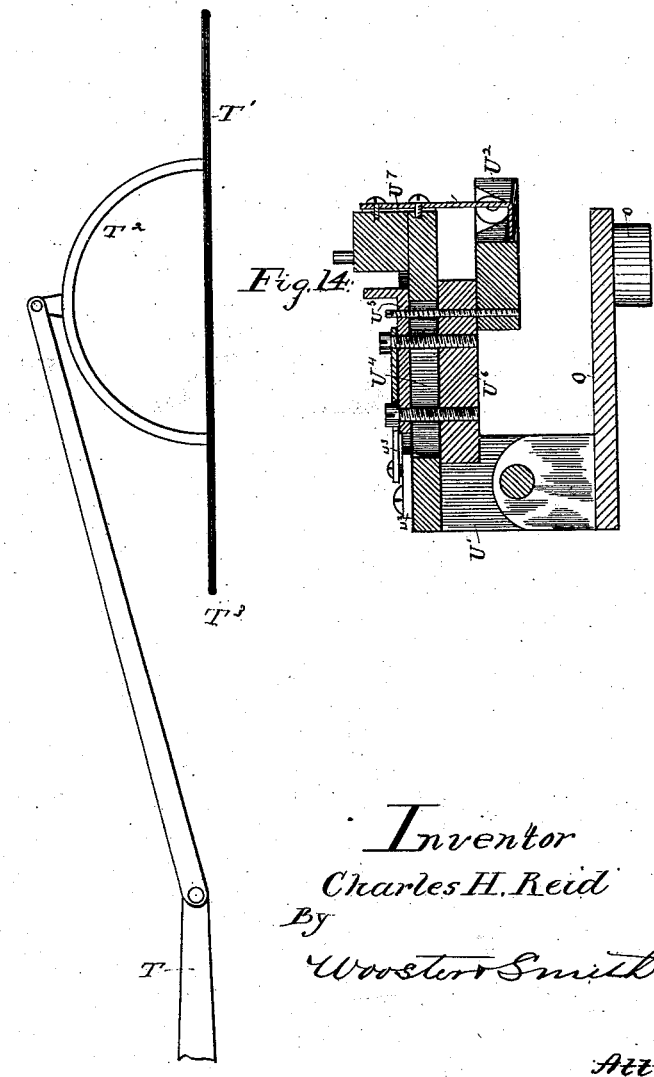
Witnesses
S. S. Wm. son
A. M. Wooster
Inventor
Charles H. Reid
By
Wooster & Smith
Attys.

(No Model.)
C. H. REID.
HAT MANUFACTURING MACHINE.
No. 292,356. Patented Jan. 22, 1884.
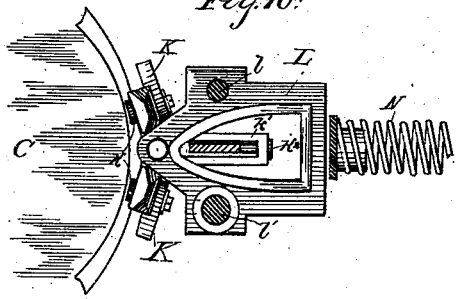
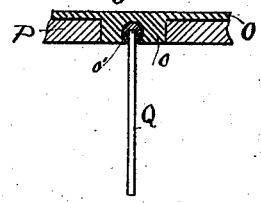
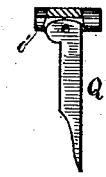
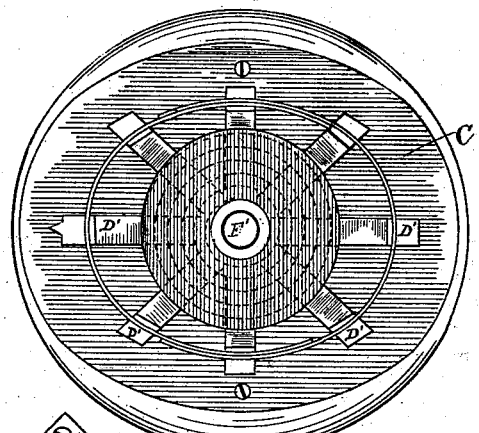
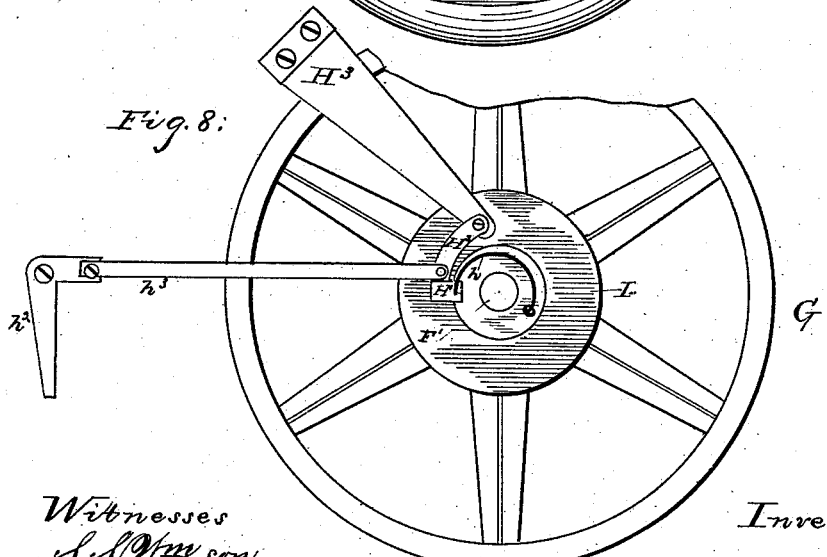
Witnesses
Inventor
Charles H. Reid
By Wooster Smith
Atty's (No Model.)

C. H. REID.
HAT MANUFACTURING MACHINE.

No. 292,356. Patented Jan. 22, 1884.

Witnesses
S. S. Williamson
H. M. Wooster

Inventor
Charles H. Reid
By Wooster & Smith
Attys.

UNITED STATES PATENT OFFICE.

CHARLES H. REID, OF DANBURY, CONNECTICUT.

HAT-MANUFACTURING MACHINE.

SPECIFICATION forming part of Letters Patent No. 292,356, dated January 22, 1884.

Application filed May 1, 1883. (No model.)

*To all whom it may concern:*

Be it known that I, CHARLES H. REID, a citizen of the United States, residing at Danbury, in the county of Fairfield and State of Connecticut, have invented certain new and useful Improvements in Hat-Manufacturing Machines; and I do hereby declare the following to be a full, clear, and exact description of the invention, such as will enable others skilled in the art to which it appertains to make and use the same.

My invention relates to the manufacture of hats, and has for its object to trim, iron, curl, and plane the brims in a single operation by the successive action of separate tools, the essential principle being that a hat once placed on the clamp need not be touched until the operation is complete.

With this end in view my invention consists in the construction and combination of elements, which will be hereinafter fully described, and then specifically designated by the claims, and, also, in the process described of trimming, ironing, and curling hats, whereby the hat, after blocking, is made ready for shaping and finishing.

In order to enable those skilled in the art to which my invention relates to construct and use my improved machine, I will proceed to describe the same, referring by letters to the accompanying drawings, forming part of this specification, in which—

Figure 1:
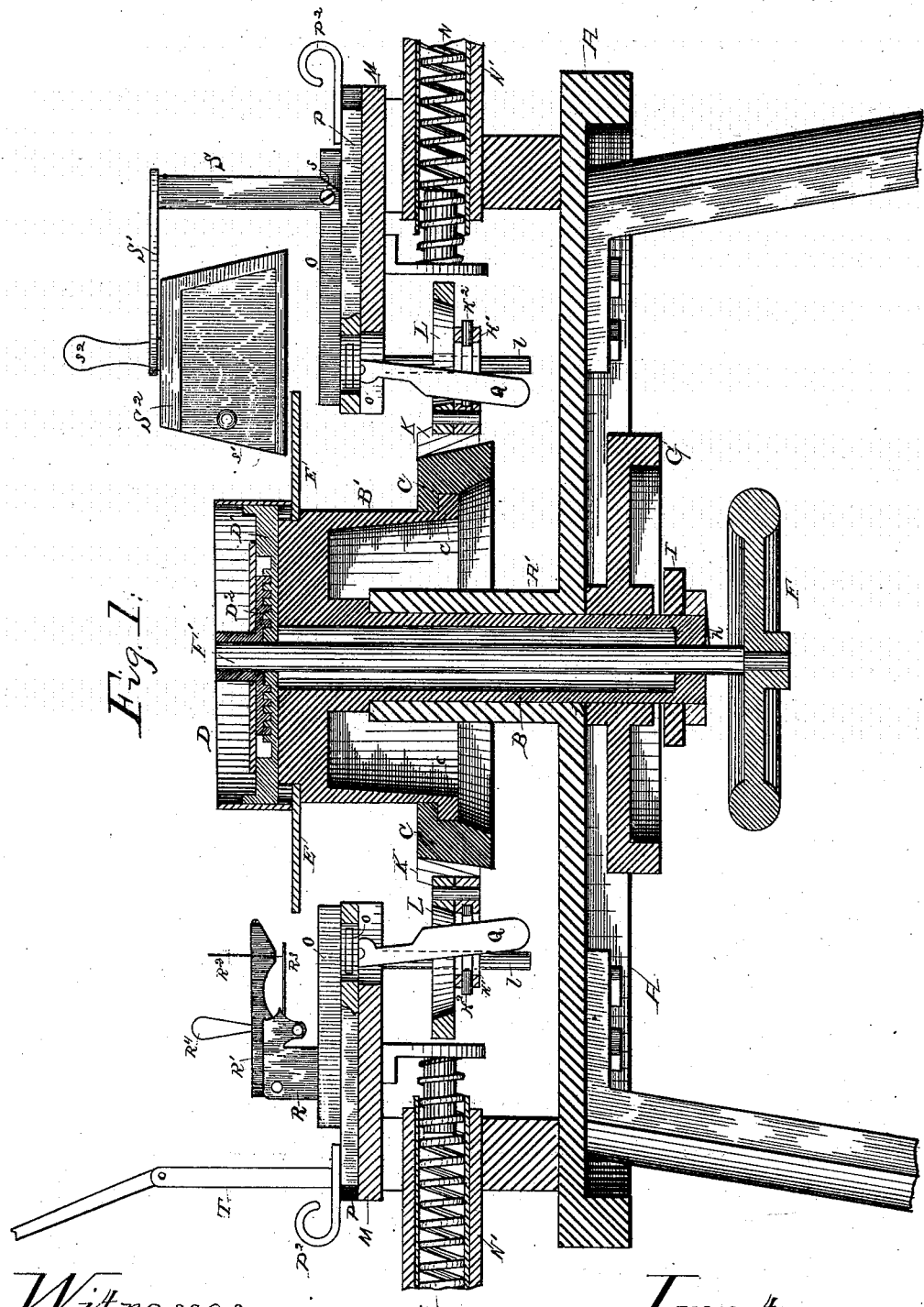
Figure 2:
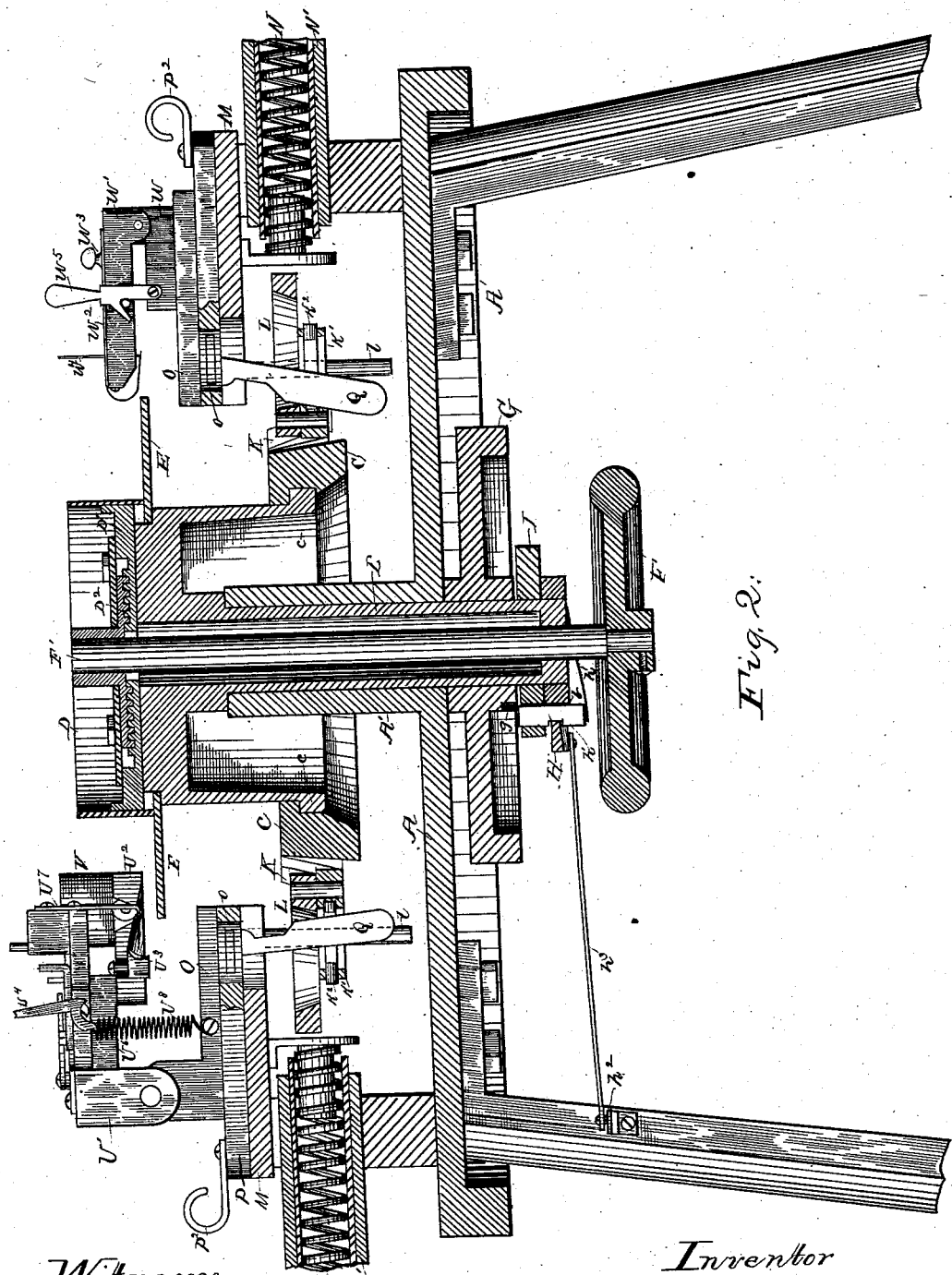
Figure 15:
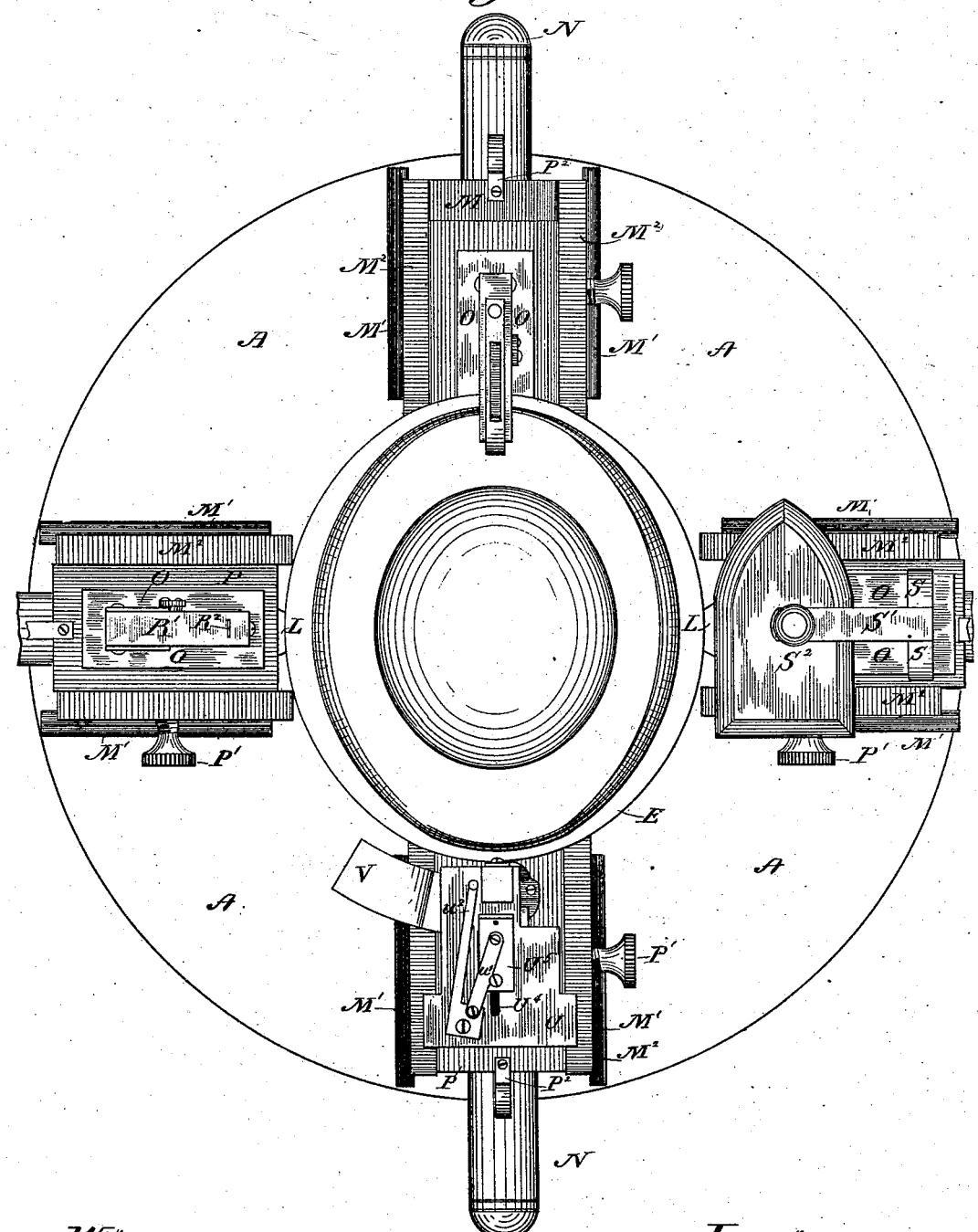

Figure 1 is a vertical longitudinal section of the machine, showing the trimmer and ironer in elevation. Fig. 2 is a vertical longitudinal section at right angles to the plane of Fig. 1, showing the curler and planer in elevation. Fig. 3 is a plan view of the curler. Fig. 4 is a bottom and Fig. 5 is a front view of the turner and the curling-block. Fig. 6 is an elevation of the clutch. Fig. 7 is an elevation of the ironing-cloth and frame. Fig. 8 is a bottom view of the clutch. Fig. 9 is a side elevation of the sliding block and head, showing the shoe in section. Fig. 10 is a plan view of the head and shoe, showing the guides in section. Fig. 11 is a plan view of the former and clamp with the platform removed. Fig. 12 is a cross-section of the oscillating tool-carrier, showing the steerer in elevation. Fig. 13 is a detail view of the pin and steerer. Fig. 14 is a longitudinal section of the curler; and Fig. 15 is a plan view of the entire machine, showing a hat upon the clamp and the planer in operative position.

Similar letters indicate like parts in all the figures of the drawings.

A represents the bed-plate of the machine, and A' an upwardly-projecting supporting-sleeve cast with or attached thereto.

B is a hollow driving-shaft, and B' is a supporting-drum cast therewith or attached thereto.

C is the former, which rests upon flange $c$ of the drum, to which it may be secured in any suitable manner. The edge or operative surface of the former is that of an elliptical curve; but the difference between the longest and the shortest diameters of the ellipse decreases from top to bottom, so that a horizontal section at the bottom more nearly approaches a circle than at the top, as shown in Fig. 11.

D is the clamp which holds the hat while the brim is being acted on. This clamp consists of a series of radial arms, D', which engage with a rotating scroll-wheel, $D^2$, by which means the arms may be simultaneously projected or withdrawn. Two or more elastic metallic bands are attached to the outer extremities of two of said arms, so that when the arms are projected the metallic bands will conform to the figure of the hat-body and securely hold it in place, as shown in my Patent No. 237,128, dated February 1, 1881.

E is the platform upon which the hat-brim rests.

F and F' represent the wheel and central shaft which operate the scroll-wheel.

G is a driving-pulley running loosely on the driving-shaft, but adapted to be thrown into gear with said shaft by means of a clutch, H.

I is a collar rigidly attached to the driving-shaft by a set-screw, $i$. This collar forms a guideway for clutch-pin H'. The normal position of this clutch-pin is in engagement with pulley G, in which position it is held by a spring, $h$. The clutch-pin slides in a groove, $b$, in an enlargement, $H^2$, of the driving-shaft, and when the machine is in gear its upper end slides into a corresponding groove, $g$, in the driving-pulley. About midway of its length, on its outer edge, the clutch-pin is provided with a shoulder, h'. When it is desired to stop the machine, a wedge, H², is moved forward, and its inclined face, acting upon the shoulder on the clutch-pin, forces it down, and thereby disengages the driving-shaft from pulley G. As the pin rotates with the driving-shaft, it follows that the machine can only be stopped in a certain position, as the wedge, when moved forward, rides on the surface of the enlargement until the clutch-pin comes round, when it engages the shoulder h', and the pin is forced down out of engagement with the driving-pulley. In actual use I have found that the rotating former does not move an eighth of an inch after the disengagement of the clutch-pin and driving-pulley. In Fig. 8 I have shown the arrangement of the clutch.

H³ is a bracket attached to the frame-work of the machine, to which the wedge is pivoted. The wedge is operated by a bell-crank lever, h², attached to any convenient portion of the frame-work of the machine, and connected to the wedge by a rod, h³. If preferred, the wedge may be pivoted directly to one of the legs of the machine, the operating end being curved to conform to the enlargement on the driving-shaft. Having adjusted the hat upon the clamp, it is ready to be acted upon by the trimmer. The wedge having been thrown out of engagement with the clutch-pin by lever and rod h² h³, the clutch-pin is forced by spring h into engagement with the driving-pulley, which instantly imparts its motion to the driving-shaft and the parts carried thereby.

K represents shoes which bear against the former. Each shoe is provided with bearing-points k, which I prefer to make in the form of hemispheres slightly curved on the outer sides, which come in contact with the surface of the former. These hemispheres rest in sockets in the shoe, and have partial rotation therein in any direction, to conform to the varying inclinations of the surface of the former, and may be held in place by a wire or cord, as shown in Fig. 9, or in any other suitable manner. Each shoe is pivoted to the extremity of a head, L, and is provided with a slotted extension, k', which vibrates as the former revolves and the shoe conforms to the elliptical surface thereof. The head L is capable of vertical adjustment upon guides l l', the latter being provided with a sleeve, l², having a male screw-thread, and a handle, l³, having a female screw-thread, whereby the head may be raised or lowered. These guides are attached to a sliding block, M, which is forced forward by a spring, N, seated in a sleeve, N', and acting against a downwardly-projecting rigid arm upon the block, so that the block and head will move in and out as the former C rotates and its elliptical surface bears against the shoe.

O is the oscillating tool-carrier, which is provided on its under side with a circular lug, o, which fits into a corresponding circular opening in the adjusting-plate P. Lying within the circular lug is an oscillating pin, o', to which is pivoted a steerer, Q, which projects downward therefrom and enters the slot in the extension k'. The steerer is free to swing on its pivot, and pin o' permits it to vibrate laterally. The two constitute a universal joint and permit movement of the steerer in any direction. In like manner the extension k' is provided with a slotted oscillating pin, k², through which the steerer passes, thereby obviating all liability of cramping, so that the steerer may snugly fit the slot in pin k², but will also yield when the shoe and adjusting-plate are out of line with each other. The operation of the parts just described is as follows: It will of course be understood that different horizontal sections of the former would give different ellipses, and that the head may be adjusted to the proper ellipse by means of screw l². The rotation of the former imparts to the head L and sliding block M an in-and-out movement, which causes the several tools to conform to the ellipse of the former. The bearing-points k of the shoe, when acted upon by the former, impart to the slotted extension k' a lateral vibration, which is transmitted to tool-carrier O by means of the steerer Q. The effect of this movement is to always maintain the tool in a plane tangent to the curve of the ellipse. The sliding block M moves on ways M', attached to the bed-plate of the machine in any suitable manner, (see Fig. 3,) and is provided with flanges M², between which the adjusting-plate is secured by a set-screw, P'. The adjusting-plate and tool-carrier and all parts attached thereto may be removed when the set-screw is loosened, thereby giving access to all the delicate parts of the machine for the purposes of cleaning or repairs. Each adjusting-plate is provided with a handle, P², by which it is controlled, and when adjusted to its proper operative position it is held there by the set-screw. The first tool to act upon the hat is the trimmer, the object of which is to trim or cut the brim of the hat at the proper distance from the body all around, giving to the brim at the same time any desired elliptical figure. Once adjusted to the proper curve, the operative parts are self-controlling.

R is the standard, to which the knife-carrier R' is hinged. R² is the knife, mounted in said carrier. R³ is a bearing attached to the standard, which slips under the brim of the hat, and against which the point of the knife rests. The hinge above referred to enables the carrier and knife to be thrown back during adjustment of the parts and when not in use. A clamp or latch (see similar latch in planer in Fig. 2) engages with a pin and holds the knife-carrier down when in use. The circular lug o upon the tool-carrier, which engages with a corresponding opening in the adjusting-plate, permits oscillation of the tool-carrier, which serves in this instance to point the edge of the knife in a direction tangent to the curve of the ellipse at the point where the knife is—that is to say, the plane of the tool— in this instance the knife—is maintained in a plane at right angles to a radius of the circle of which the curve at that point would form a portion.

The operative parts of the trimmer are substantially like those shown in my former patent above referred to.

The next tool to act upon the hat is the ironer.

S S (one not shown) are pivoted standards supporting an arm, S', to which the iron S² is attached in any suitable manner. The iron is provided with a handle, $s^2$.

$s$ indicates a bevel at the outer lower corners of the standards, which serve as stops or rests when the iron is turned back out of use.

The iron S² is made hollow, and provided with a sliding door, $s'$, and may be heated by "slugs," or by gas, if preferred.

T is a jointed standard, which supports the ironing-cloth T'. The edge of this cloth is supported by a wire, T³, and is attached to a metallic yoke, T², (see Fig. 7,) which passes over the crown of the hat. In use, after the operation of trimming, the ironing-cloth is dampened and is brought down over the hat to prevent the iron from coming in contact with the hat itself, and to prevent glazing. The ironing-cloth is made sufficiently large, so that the wire at the edge thereof drops down over the edge of platform E, so that the iron may come in contact only with the cloth. The primary function of the ironer is to soften the brim and prepare it to be acted on by the curler, which I will now describe.

U is the supporting-plate, having two downwardly-projecting arms, U', by means of which it is pivoted to its tool-carrier.

U² is the curling-block.

U³ is the turner, secured to the curling-block by a plate-spring, $u$, which allows the turner to yield and insures the turning up of the brim. The supporting-plate U is provided with a central longitudinal slot, U⁴. Resting on the supporting-plate over said slot is a sliding cap-plate, U⁵. Two or more screws pass through the cap-plate and through slot U⁴ into a block, U⁶, to which the curling-block U² is attached by screws or in any suitable manner. The precise manner in which these parts are secured together is not of the essence of my invention; but numerous unimportant changes may be made without departing from the spirit thereof.

The curling-block, which is clearly illustrated in Figs. 4 and 5, is slightly curved upon its inner edge, and is attached to block U⁶ in such a manner as to be substantially parallel with the curve of the former. At its inner edge, upon the under side, it is hollowed out to enable it to turn over the edge of the brim. Beginning at the turner, which first bends the edge upward, the curve gradually diminishes toward the other end until the turned-over portion of the brim is pressed down close to the guard U⁷, which acts to hold the turned-over portion against the curling-block and prevents it from doubling. This guard is made adjustable, and is attached to the supporting-plate, or a block forming part thereof, by means of screws passing through a longitudinal slot. It may be raised or lowered by simply loosening the screws. The lower portion of the guard is usually broadened out and bent at right angles, and passes under the turner and a portion of the curling-block.

$u'$ is an anti-friction roller projecting slightly below the curve of the block, and acting to assist the brim forward as the curl widens, and to prevent it from binding. In order to prevent the brim from getting hard before the operation of curling is complete, I provide a chamber, as at V, in the farther end of the curling-block, and by means of heated slugs or gas the curling-block may be kept at any desired temperature, the object being to keep the brim soft while under the action of the curler, but at the same time to avoid any danger of glazing or burning the hat. Having placed the adjusting-plate and the parts carried thereby in proper position, they are secured by tightening set-screw P'. The operative parts, however, are not yet in position to act on the hat, but are moved forward by mechanism which I will now describe. It will of course be understood that the cap-plate, block U⁶, and the curling-block are rigidly connected and slide together.

$u^2$ is a lever pivoted to the supporting-plate, and connected to the cap-plate by a link, $u^3$. The link is so pivoted to lever $u^2$ that when the arm of the lever is turned forward it acts as a bell-crank, and carries cap-plate, and with it the curling-block, forward into operative position. In order to withdraw the turner and curling-block from their operative position, it is only necessary to turn the arm of the lever backward. It should be understood that when the pivot which connects the link to the lever is moved past the pivotal point of the lever in carrying the cap-plate forward the parts become locked in their operative position. The forward end of the cap-plate may be provided with an upturned lip or flange, to act as a stop to the lever; or the link may be provided with a notch to engage with a screw or pin in the cap-plate.

U⁸ is a heavy spring, one end of which is attached to the tool-carrier. At the other end a latch, $u^4$, is attached, which engages with a screw or pin on the supporting-plate. This spring acts to hold the tool down against the brim, but is capable of yielding as the edge of the brim is turned over by the curling-block.

The last tool to act upon the hat is the planer. This tool in construction somewhat resembles the trimmer.

W is the standard, to which the planer-arm W' is hinged.

W² is a finger attached to the upper side of the planer-arm by means of a set-screw, W³, which passes through a slot (not shown) in the finger, thereby making it adjustable. The finger lies along the top of the planer-arm, and is curved over the end of the arm, and extends under the same, where it serves as a guard to the planer-knife W⁴, which passes through another slot in the finger, and is held by a setscrew, or in any other suitable manner.

W⁵ is a latch pivoted to the standard, and engaging with a pin on the planer-arm to hold it down to its operative position. When not in use, the planer may be thrown back out of the way, the same as the tools already described. The function of the planer is to plane off any irregularities in the ellipse of the edge of the brim after it has been curled. In use the finger is moved forward and passes under the curl of the brim, while at the same time it acts as a guard to prevent the knife from cutting the unturned portion of the brim. This tool is adjusted to its proper position on the former by a sleeve and handle, as shown at $l^2$ $l^3$ in Fig. 9, as are the other tools. The "jacks," or parts which constitute the supporting and controlling mechanism are identical in all of the tools.

I have described a trimmer, ironer, curler, and planer, each of which is used in connection with a tool-carrier, an adjusting-plate, a sliding block, steerer, adjustable head, and shoe. Any other tools that may be required in the manufacture of hats may be applied in the same manner.

I am well aware that a brim-curler, a flattener, and a breaker have been used in connection with a revolving hat-supporter, and make no claim to the invention of that combination.

Having fully described my invention, what I claim as new, and desire to secure by Letters Patent, is—

1. In a hat-machine, the rotating clamp and former, constructed as described, in combination with the clutch, as set forth.

2. The driving-shaft carrying the former, in combination with the collar and spring-actuated clutch-pin.

3. A driving-pulley capable of rotating loosely on the driving-shaft, a rigid collar forming a guideway for a clutch-pin, and an enlargement on the driving-shaft in which the clutch-pin slides, in combination with a wedge which, when moved forward, rides on the surface of the enlargement until the clutch-pin comes round, when it engages a shoulder thereon and forces it down out of engagement with the driving-pulley, so that the machine can only be stopped in the position in which the clutch-pin is engaged by the wedge.

4. In a hat-machine, the driving-shaft carrying the former, pulley, and the collar, in combination with the clutch-pin and the wedge.

5. In a hat-machine, the collar, clutch-pin, and the wedge, in combination with the bell-crank lever and the connecting-rod.

6. The bracket and the wedge pivoted thereto, in combination with the central shaft and spring pivoted thereto, the clutch-pin, collar, and the wedge.

7. The rotating clamp and former, in combination with the trimmer, substantially as described.

8. The rotating clamp and the former, in combination with the driving-pulley, clutch, and the trimmer.

9. The rotating clamp and former, constructed as described, in combination with an ironer.

10. The rotating clamp and the former, in combination with the driving-pulley, clutch, and the ironer.

11. The iron, in combination with standards having beveled edges, which serve as stops or rests when the iron is turned back out of use.

12. The iron-supporting standards and tool-carrier, in combination with adjusting-plate, sliding block, steerer, and adjustable head.

13. The rotating clamp and former, in combination with the ironer and the ironing-cloth.

14. In a hat-machine, the ironing-cloth having its edge supported by a wire, and attached to a metallic yoke which covers the body of the hat.

15. The yoke and ironing-cloth, in combination with the adjusting-plate and jointed standard, whereby the ironing-cloth may be thrown back out of the way when not in use.

16. The rotating clamp and the former, in combination with the curler, substantially as described.

17. The rotating clamp and the former, in combination with the driving-pulley, clutch, and the curler, substantially as described.

18. The adjusting-plate and tool-carrier, in combination with the supporting-plate and the curling-block.

19. The adjusting-plate and tool-carrier, in combination with the supporting-plate, the curling-block, and the turner secured thereto by a spring.

20. The supporting-plate having a central slot, the sliding cap-plate, and the block secured thereto, in combination with the curling-block.

21. The slotted supporting-plate, cap-plate, and block, in combination with the curling-block, the turner, and the guard.

22. The adjustable guard, curling-block, and supporting-plate, in combination with a holding-spring, for the purpose set forth.

23. The curling-block and supporting-plate, in combination with pivoted standards and the tool-carrier, whereby the operative parts may be thrown out of the way when not in use.

24. The supporting-plate and the operating parts carried thereby, in combination with the tool-carrier, the adjusting-plate, and the sliding block.

25. The supporting-plate and the operating parts carried thereby, in combination with the tool-carrier, the adjusting-plate, the sliding block, the steerer, and the head.

26. The curler, as described, in combination with the tool-carrier, the adjusting-plate, the sliding block, the steerer, the adjustable head carrying the shoe, and the former.

27. The curler, as described, in combination with the tool-carrier, the adjusting-plate, the sliding block, the steerer, the adjustable head, and bearing-points, for the purposes set forth.

28. The tool-carrier, constructed as described, in combination with the supporting-plate, and a curling-block provided with a heating-chamber, for the purpose set forth.

29. The supporting-plate, in combination with the sliding plate, the link, and the lever, for the purpose set forth.

30. The operating-lever pivoted to the supporting-plate, in combination with the sliding plate, and a link connecting the sliding plate with the lever, and pivoted thereto at one side of its center of motion, so that when the lever is turned to its forward position the sliding plate is carried with it and is locked in such forward position.

31. The rotating clamp and the former, in combination with the planer, substantially as described.

32. The rotating clamp and the former, in combination with the driving-pulley, clutch, and the planer, substantially as described.

33. The tool-carrier, in combination with the standard, and the planer-arm, substantially as described.

34. The planer-arm, in combination with the finger and the knife, for the purpose set forth.

35. The knife and adjustable finger, in combination with the hinged planer-arm and the latch.

36. In a planer for trimming hat-brims, the adjustable curved finger, adapted to pass under the curl of the brim and to act as a guard to the knife.

37. The planer, constructed as described, in combination with the tool-carrier, the adjusting-plate, and the sliding block.

38. The planer-arm and operating parts carried thereby, in combination with the tool-carrier, the adjusting-plate, the sliding block, the steerer, and the head.

39. The planer, as described, in combination with the tool-carrier, the adjusting-plate, the sliding block, the steerer, the adjustable head carrying the shoe, and the former.

40. The planer, as described, in combination with the tool-carrier, the adjusting-plate, the sliding block, the steerer, the adjustable head, and bearing-points.

41. In a hat-machine, the combination, with a rotating clamp and former, of a non-rotating curler and a planer, for the purposes set forth.

42. In a hat-machine, the combination, with a rotating clamp and former, of a non-rotating ironer and a curler, for the purposes set forth.

43. In a hat-machine, the combination of an ironer, a curler, and a planer with a rotating clamp and former, for the purposes set forth.

44. In a hat-machine, the combination, with a rotating clamp and a former, of a series of non-rotating tools adapted to act upon the hat.

45. In a hat-machine, the combination, with a clamp and former, of a trimmer, an ironer, a curler, and a planer, whereby the hat, after blocking, is made ready for shaping and finishing.

46. The circular bed-plate and supporting-sleeve, in combination with the clamp and former, and a series of tools placed around the former and adapted to act upon a hat-brim.

47. The process of trimming and curling hats, which consists in imparting to the hat a rotary motion, and then subjecting it to the successive action of trimming and curling tools.

48. The process of trimming and curling hats, which consists in imparting to the hat a rotary motion, and then subjecting it to the successive action of trimming, ironing, and curling tools.

49. The process of trimming, curling, and planing hats, which consists in imparting to the hat a rotary motion, and subjecting it to the action of a series of non-rotating tools.

In testimony whereof I affix my signature in presence of two witnesses.

CHARLES H. REID.

Witnesses:
  A. M. WOOSTER,
  S. S. WILLIAMSON.